United States Patent [19]
Bertsche et al.

[11] Patent Number: 5,584,621
[45] Date of Patent: Dec. 17, 1996

[54] DIRECT DRIVE MULTIPLE AXES ROTARY SPINDLE HEAD FOR MILLING MACHINE

[75] Inventors: Richard Bertsche; Richard W. Bertsche, both of Long Grove, Ill.

[73] Assignee: Bertsche Engineering Corp., Buffalo Grove, Ill.

[21] Appl. No.: 489,892

[22] Filed: Jun. 13, 1995

[51] Int. Cl.⁶ .................................................. B23C 1/12
[52] U.S. Cl. .............................. 409/201; 409/216; 901/24
[58] Field of Search ............................ 409/201, 199, 409/211, 216; 408/236; 901/23, 24, 28

[56] References Cited

U.S. PATENT DOCUMENTS

| | | | |
|---|---|---|---|
| 4,592,684 | 6/1986 | Baker | 409/132 |
| 4,712,973 | 12/1987 | Garin et al. | 414/744 |
| 4,993,138 | 2/1991 | Yang | 29/560 |
| 4,999,533 | 4/1991 | King et al. | 310/90 |
| 5,068,556 | 11/1991 | Lykes et al. | 310/90 |
| 5,155,423 | 10/1992 | Karlen et al. | 318/568.11 |
| 5,231,264 | 7/1993 | Fujita | 219/121.78 |
| 5,257,883 | 11/1993 | Armando | 409/201 |
| 5,391,970 | 2/1995 | Chaffee et al. | 318/618 |
| 5,392,977 | 2/1995 | Kato | 226/118 |
| 5,394,335 | 2/1995 | Rush | 364/474.21 |

FOREIGN PATENT DOCUMENTS

| | | | |
|---|---|---|---|
| 254542 | 3/1988 | Germany | 409/201 |
| 144644 | 9/1982 | Japan | 409/199 |
| 171239 | 10/1983 | Japan | 409/216 |

Primary Examiner—Daniel W. Howell
Attorney, Agent, or Firm—Olson & Hierl, Ltd.

[57] ABSTRACT

A gearless, direct drive, multiple axes rotary head for a machine tool is provided which includes a spindle mounted to the rotary head for rotation thereon about multiple axes and a plurality of motors coupled to the head and spindle for directly driving and controlling the rotation the head and spindle about the multiple axes respectively.

22 Claims, 6 Drawing Sheets

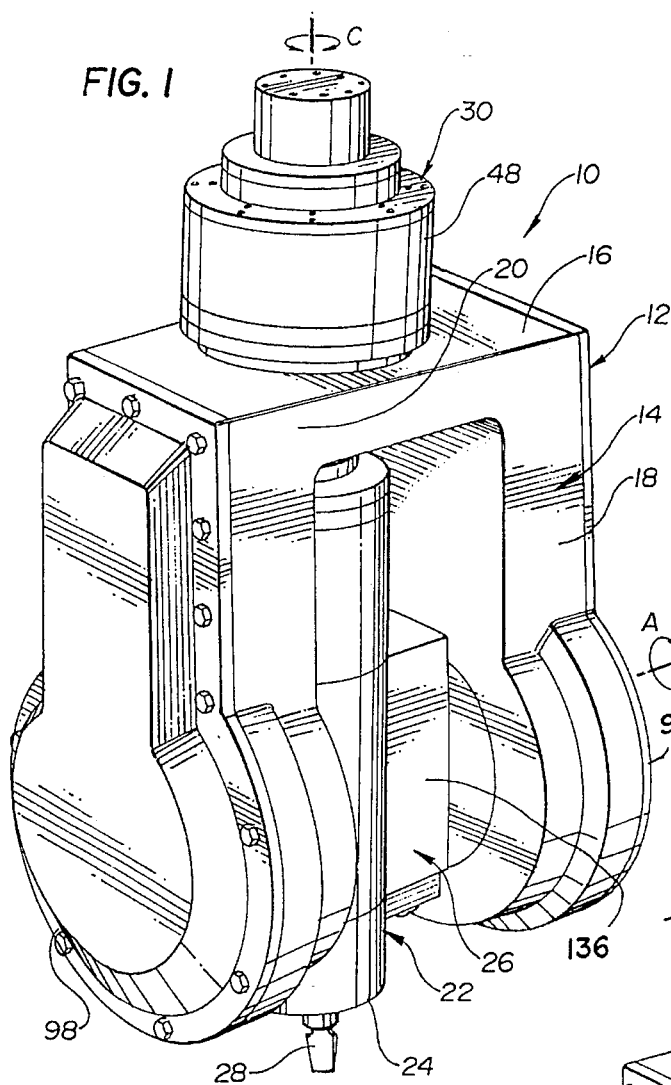
FIG. 1
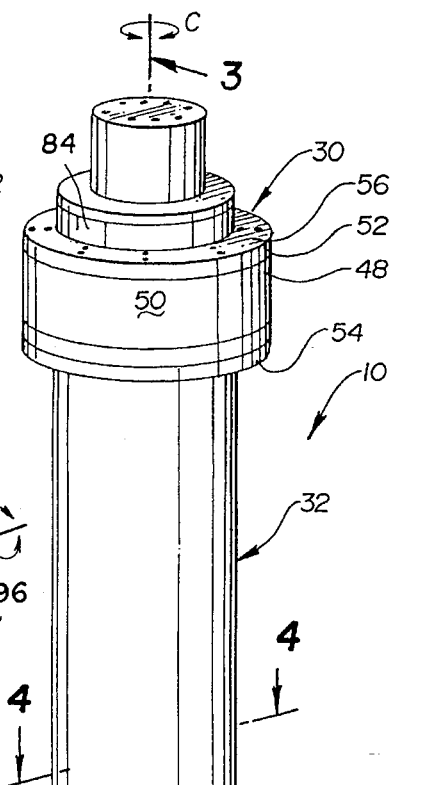
FIG. 2
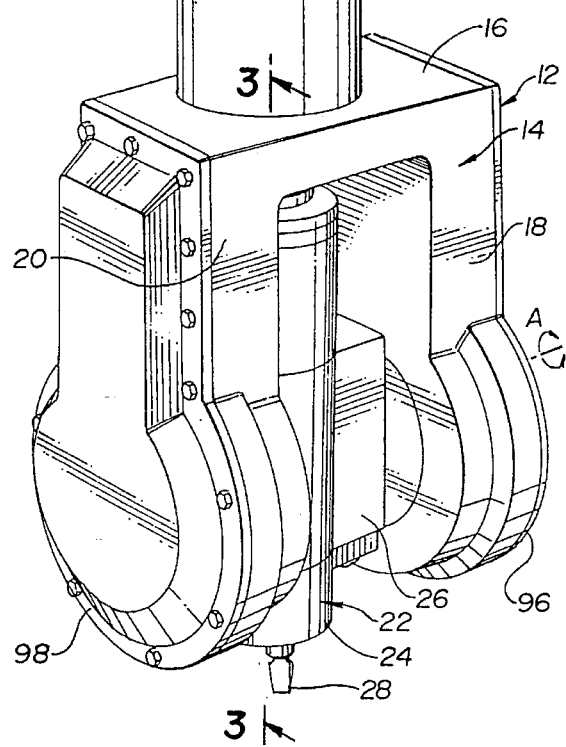

DIRECT DRIVE MULTIPLE AXES ROTARY SPINDLE HEAD FOR MILLING MACHINE

FIELD OF THE INVENTION

The present invention relates to a machine tool and, more particularly, to a gearless operating spindle head for a milling machine which is equipped with motors coupled to the spindle and spindle head of such machine for directly driving and controlling the rotation of such spindle and spindle head about multiple axes.

BACKGROUND OF THE INVENTION

In conventional multi-functional machine tools such as multi-functional milling machines, the multi-axial movement and rotation of the milling spindle and spindle head is controlled by remotely mounted motors which use timing belts, worm gears and worm wheels, bevel gears and parallel spur or bevel gears, individually or in combination, operably coupled to the spindle and spindle head to rotate the spindle and spindle head about multiple axes.

With the advent of linear motor technology and its application to machine tools, linear axes are being driven faster as cutting feedrates are being pushed higher. In the die and aerospace industries in particular, the machining of complex surfaces requires that the tool be kept at a particular angle with respect to the surface being machined. As the linear axis or contour of the surface being machined abruptly changes, a correcting movement is required by the rotary axis to maintain the required angular relationship between the tool and the surface being machined. For example, when a box shaped cavity is machined with a side wall-draft angle of 15 degrees, the tilt angle of the tool must be rotated 90 degrees at each quadrant point. To avoid slowing down the cutting process, the spindle head must be at 90 degrees at very high acceleration around the corner. This is difficult to achieve with a geared spindle head.

Thus, there remains a need for an operating spindle head which can be rotated at high speeds in response to the abrupt and continuous changes in the contour of a surface being machined so as to maintain the required angular relationship between the spindle head and such surface.

SUMMARY OF THE INVENTION

The present invention is a gearless direct drive rotary head for a machine tool spindle comprising a gimbal assembly mounting a spindle for rotation about a plurality of axes and a plurality of motors coupled to the gimbal assembly and the spindle for directly driving and controlling the rotation of the gimbal assembly and the spindle about the plurality of axes respectively.

In one embodiment of the present invention, the gimbal assembly includes a fork mounted for rotation about a first axis which includes a pair of spaced fork arms, a spindle mounted between the fork arms for rotation about a second axis, a first motor coupled to the fork for directly driving and controlling the rotation of the fork about the first axis, and a second motor coupled to the spindle for directly driving and controlling the rotation of the spindle about the second axis.

The fork is mounted on a support arm which includes a rotatable sleeve concentric with the first axis and operably coupled to the fork for rotation therewith. The support arm further includes a housing for the motor. The motor comprises a servo motor which is mounted within the housing and surrounds the sleeve concentric with the first axis. The motor includes a rotor rotatable and concentric about the first axis which is coupled to the sleeve for directly driving and controlling the rotation of the sleeve about the first axis.

According to the invention, each of the fork arms includes a hollow housing with which a second motor is mounted. Each second motor comprises a servo motor mounted in the housing in the fork arms respectively and concentric with the second axis. Each of the second motors includes a rotor rotatable and concentric about the second axis. Each of the rotors is coupled to opposite sides of the spindle respectively for directly driving and controlling the rotation of the spindle about the second axis.

In another embodiment of the present invention, the gimbal assembly further includes a spindle housing which mounts the spindle for rotation about a third axis and a third motor coupled to the spindle for directly driving and controlling the rotation of the spindle about the third axis.

The direct drive motors replace the conventional gears and timing belts which have been coupled to the spindle and spindle head for controlling the rotation of the spindle and spindle head. The directly coupled motors allow the spindle to be rotated at high speeds in response to the abrupt and continuous changes in the contour of the surface being machined so as to maintain the required angular relationship between the spindle head and such surface.

Another advantage is the tool stiffness achieved through the elimination of gears. Yet another advantage is the elimination of the power losses which occur when power is transmitted through gear trains.

Numerous other advantages and features of the present invention will become readily apparent from the following detailed description of the invention and the embodiments thereof, from the claims and from the accompanying drawings in which details of the invention are fully and completely disclosed as part of this specification.

BRIEF DESCRIPTION OF THE DRAWINGS

In the drawings;

FIG. 1 is a perspective view of one embodiment of a spindle head of a milling machine embodying the features of the present invention;

FIG. 2 is a perspective view of the spindle head of FIG. 1 further including an elongate support arm between the top motor assembly and the fork;

DESCRIPTION OF THE PREFERRED EMBODIMENTS

Figure 3:
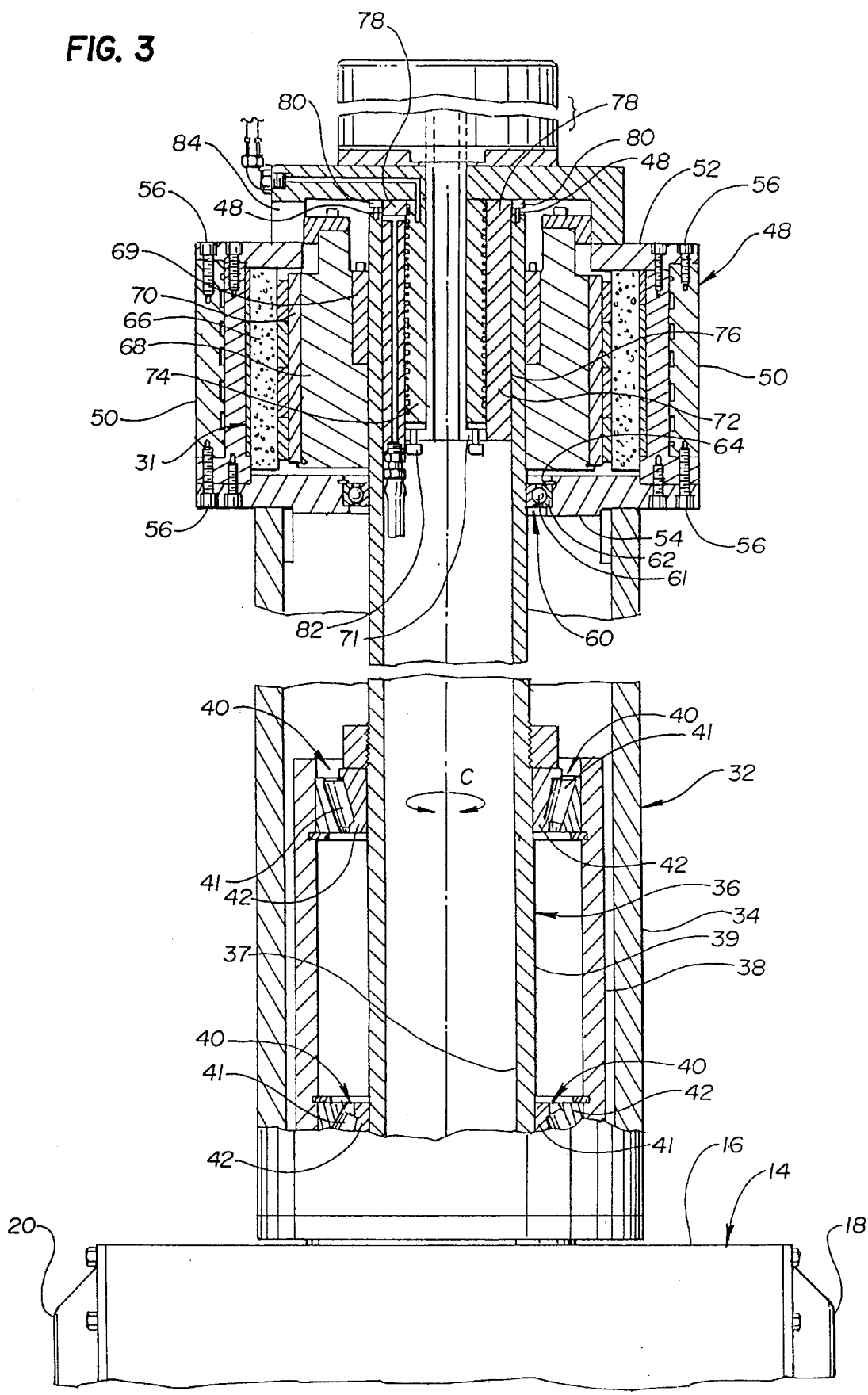
FIG. 3 is a broken partly vertical cross-sectional view of the support arm and top motor assembly of the spindle head taken generally along the plane 3—3 of FIG. 2.

The invention disclosed herein is, of course, susceptible of embodiment in many different forms. Shown in the drawings and described hereinbelow in detail are preferred embodiments of the invention. It is to be understood, however, that the present disclosure is an exemplification of the principles of the invention and does not limit the invention to the illustrated embodiments.

For ease of description, the spindle head embodying the present invention is described hereinbelow in its usual assembled position as shown in the accompanying drawings and terms such as upper, lower, horizontal, etc., will be used herein with reference to this usual position.

Some of the figures illustrating the spindle head of the invention show structural details and mechanical elements that will be recognized by one skilled in the art. However, the detailed descriptions of such elements are not necessary to an understanding of the invention, and accordingly, are not herein presented.

Additionally, the spindle head of this invention is used with certain conventional components the details of which, although not fully illustrated or described, will be apparent to those having skill in the art and an understanding of the necessary functions of such components.

Figure 7:
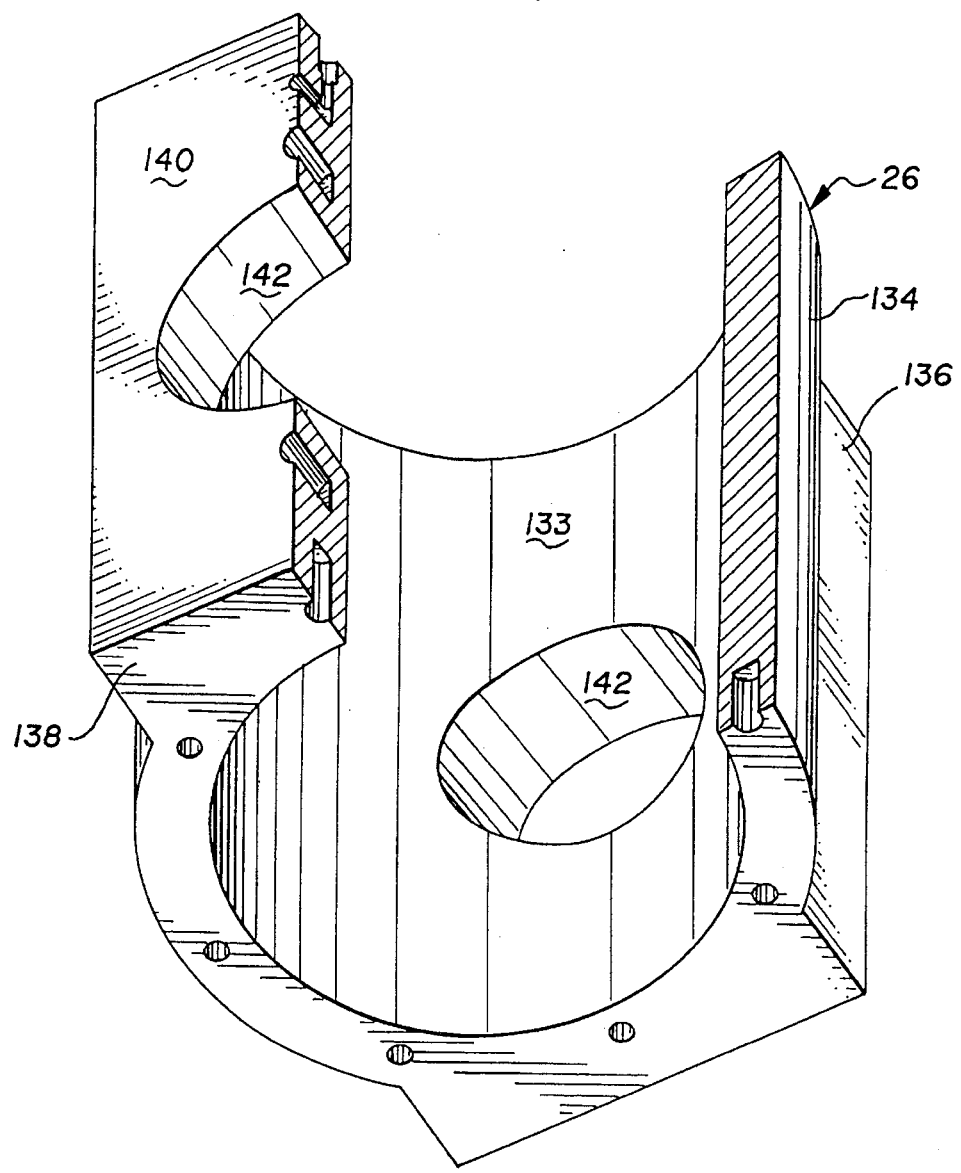
FIG. 7 is a partially cut away perspective view of the spindle housing of the spindle head of FIG. 2.

Referring now to FIG. 1, there is depicted a gearless, direct drive, multiple axes rotary spindle head 10 embodying the features of the present invention. Head 10 includes a gimbal assembly 12 which allows a spindle assembly 22 mounted thereon to be rotated about multiple axes as described below. Gimbal assembly 12 includes a fork 14 which is mounted to a multi-functional machine tool such as a milling machine (not shown) or the like for rotation about a first vertical axis C passing centrally and longitudinally through fork 14. Fork 14 includes a top horizontal base 16 and two spaced apart elongate arms 18 and 20 extending vertically downwardly perpendicularly from the ends of base 16 and unitary therewith. The spindle assembly 22 is mounted between the fork arms 18 and 20 for rotation about a second horizontal axis A passing horizontally through the fork arms 18 and 20. Spindle assembly 22 includes an elongate spindle 24 mounted within a spindle housing 26 (FIG. 7). A motor (not shown) in spindle 24 operates in a known way to rotate a milling or cutting tool 28 held in a tool holder (not shown) secured within the distal end of spindle 24.

According to the invention, a motor assembly 30 is mounted and coupled to the top of base 16 of fork 14 for directly driving and controlling the rotation of fork 14 about vertical axis C. Another motor assembly 90 (FIG. 4) is mounted inside fork arms 18 and 20 and coupled to spindle assembly 22 for directly driving and controlling the rotation of the spindle assembly 22 about horizontal axis A. The direct, as opposed to the remote, coupling of the motor assemblies 30 and 90 to the fork 14 and spindle assembly 22, respectively, eliminates the need to use gears for driving and controlling the rotation of fork 14 and spindle assembly 22 as is presently employed in spindle heads.

FIG. 2 depicts the spindle head 10 of FIG. 1 additionally including a vertically extending elongate cylindrical support arm 32, mounted between motor assembly 30 and fork 14, and having a longitudinal axis concentric with axis C.

As shown in FIG. 3, support arm 32 includes an elongate outer cylindrical sleeve 34, an elongate inner rotatable cylindrical sleeve 36 and an elongate cylindrical cartridge 38 disposed between outer sleeve 34 and inner sleeve 36. Each of the sleeves 34 an 36 and the cartridge 38 have longitudinal axes concentric with vertical axis C. Inner sleeve 36 includes inner and outer cylindrical surfaces 37 and 39 and is journalled for rotation about axis C by bearing assemblies 40 comprising bearing rollers 41 carried by bearing races 42 which are secured to sleeve 36 and cartridge 38.

Figure 4:
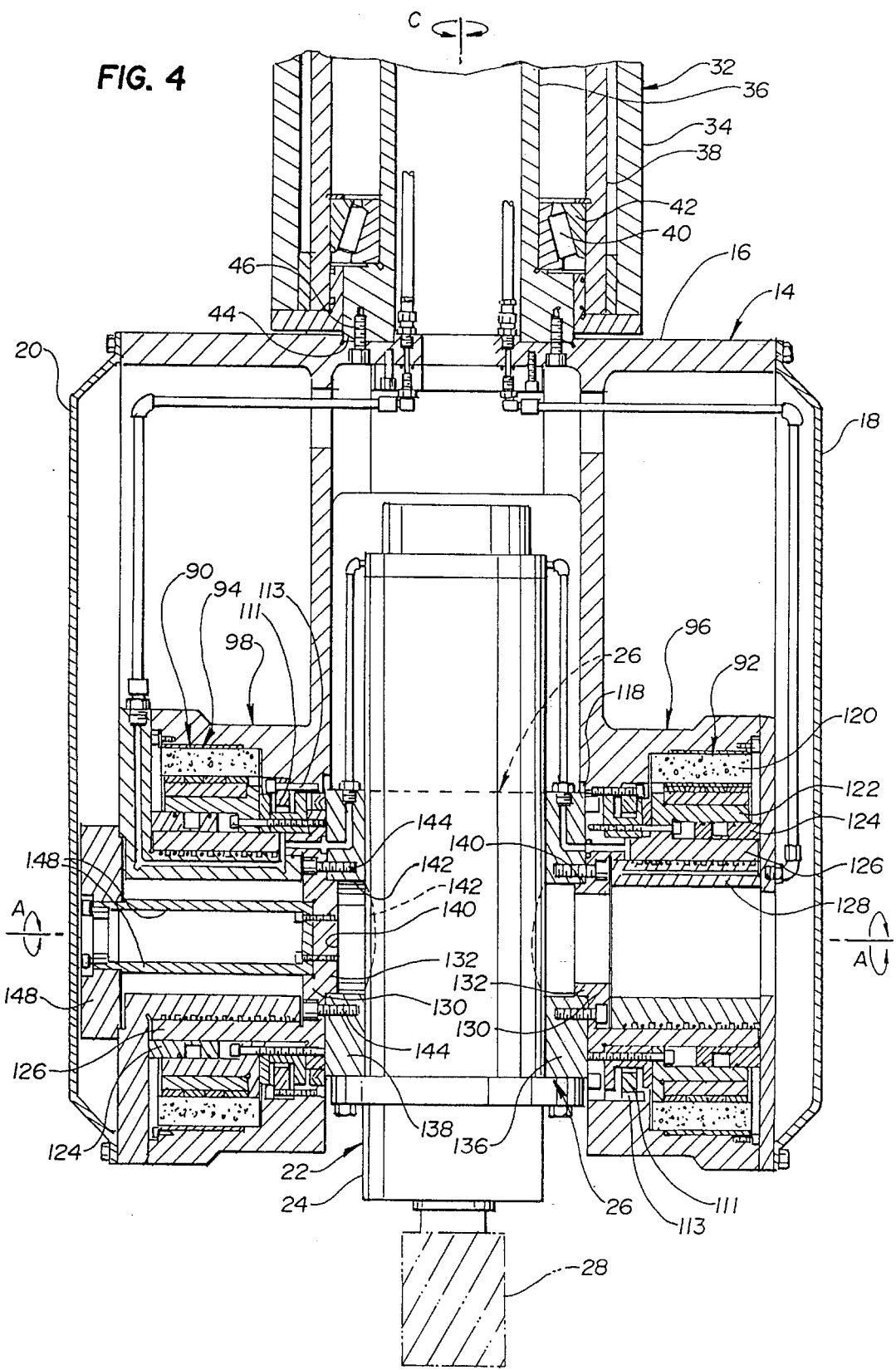
FIG. 4 is a broken partly vertical cross-sectional view of the fork and spindle assemblies of the spindle head taken generally along the plane 4—4 of FIG. 2.

As shown in FIG. 4, sleeve 36 includes a bottom circumferential annular end 44 which is coupled and secured to the top of base 16 of fork 14 by a plurality of fasteners 46 extending circumferentially around and between end 44 and base 16. Referring back to FIG. 3, motor assembly 30 is operably coupled to the top of sleeve 36 for directly driving and controlling the rotation of sleeve 36 about axis C and thus the rotation of fork 14 operably coupled thereto.

Figure 5:
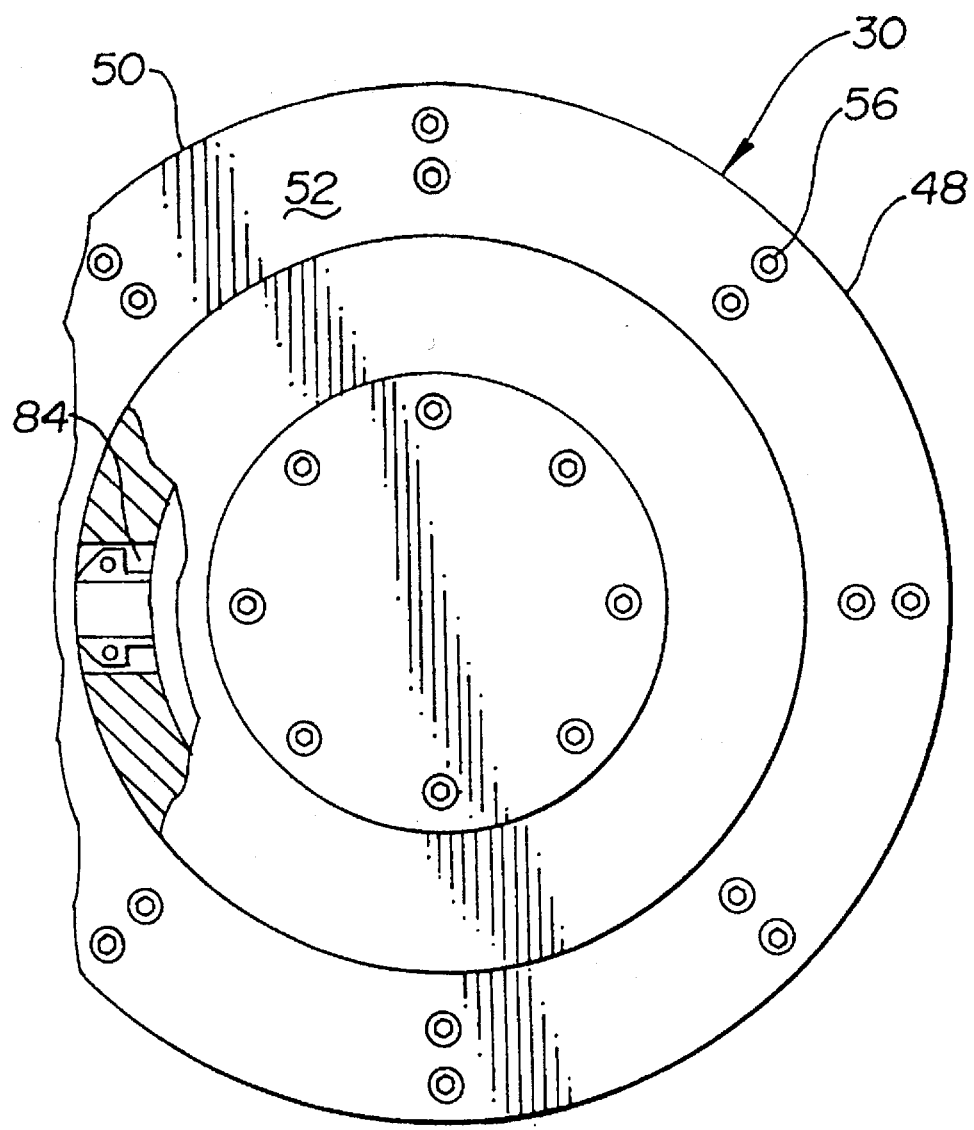
FIG. 5 is a top plan view of the spindle head of FIG. 2.

As shown in FIGS. 2, 3 and 5, support arm 32 includes a housing 48 for the motor assembly 30. Housing 48 is comprised of a outer cylindrically shaped jacket 50 which is spaced from and extends circumferentially around sleeve 36 and top and bottom circumferentially extending annular end plates 52 and 54 which are fastened with screws 56 to the opposite end faces of jacket 50. Sleeve 36 is journalled for rotation about housing 48 by bearing assemblies 60 comprising ball bearings 61 supported by bearing races 62 secured to sleeve 36 and the inner circumferential face 64 of end plate 54.

According to the present invention, motor assembly 30 comprises a frameless, high torque servo motor 31 which surrounds sleeve 36 concentric with axis C and is mounted within the interior of housing 48 and, more particularly, within the jacket 50 thereof. Motor 31 can be, for example, an Inland Motor Corporation frameless, high torque servo motor including, among other known elements, a stator 66, a rotatable mount 68 disposed inwardly of stator 66 for mounting a rotatable rotor 70 operably coupled to and abutting mount 68 and disposed between mount 68 and stator 66, a sleeve clamp 69 disposed inwardly of and abutting mount 68 and operably coupled to and abutting inner sleeve 36, and abutting rotors 72 and 74 disposed inwardly of stator 66 and, more particularly, inwardly of sleeve 36. A driver slip ring 71, disposed inwardly of and abutting rotor 74 and inside sleeve 36, is coupled to sleeve 36 by means of fasteners such as screws 82. Rotors 72 and 74 are rotatable and concentric about axis C.

Rotor 72 additionally includes an outer surface 76 abutting the inner surface 37 of sleeve 36 and an end with a radially outwardly circumferentially extending annular shoulder 78 which is seated on and coupled to the end face 48 of sleeve 36. A plurality of fasteners such as screws 80 extend through and between shoulder 78 and end face 48 for coupling and securing rotor 72 to sleeve 36 and for directly driving and controlling the rotation of sleeve 36 about axis C.

During operation, numerical controls (not shown) associated with the milling machine activate motor 31 to cause the rotation of sleeve 36 and thus fork 14. Moreover, during operation, the position and velocity of rotor 72 and thus sleeve 36 is detected and monitored by an angle encoder 84 which is mounted within housing 48 and operably coupled to rotor 72 and the machine's numerical controls. The sleeve clamp 69 is used to lock the inner sleeve 36 into position after the sleeve 36 has been rotated a desired amount to rotate the fork 14 a desired amount.

Referring to FIG. 4, motor assembly 90 comprises motors 92 and 94 mounted respectively in the fork arms 18 and 20 concentric with horizontal axis A. The motors 92 and 94 are coupled to opposite sides of the spindle assembly 22 for directly driving and controlling the rotation of the spindle assembly 22 about axis A.

Although not shown in FIG. 4, it is understood that motor assembly 90 could alternatively comprise one of the motors 92 and 94 mounted in one of the fork arms 18 and 20 and coupled to one of the sides of the spindle assembly 22 for directly driving and controlling the rotation of the spindle assembly 22 about axis A. Further, motor assembly 90 could also alternatively comprise one of the motors 92 and 94 split into first and second halves mounted in the fork arms 18 and 20 respectively and coupled to the opposite sides of spindle assembly 22.

Figure 6:
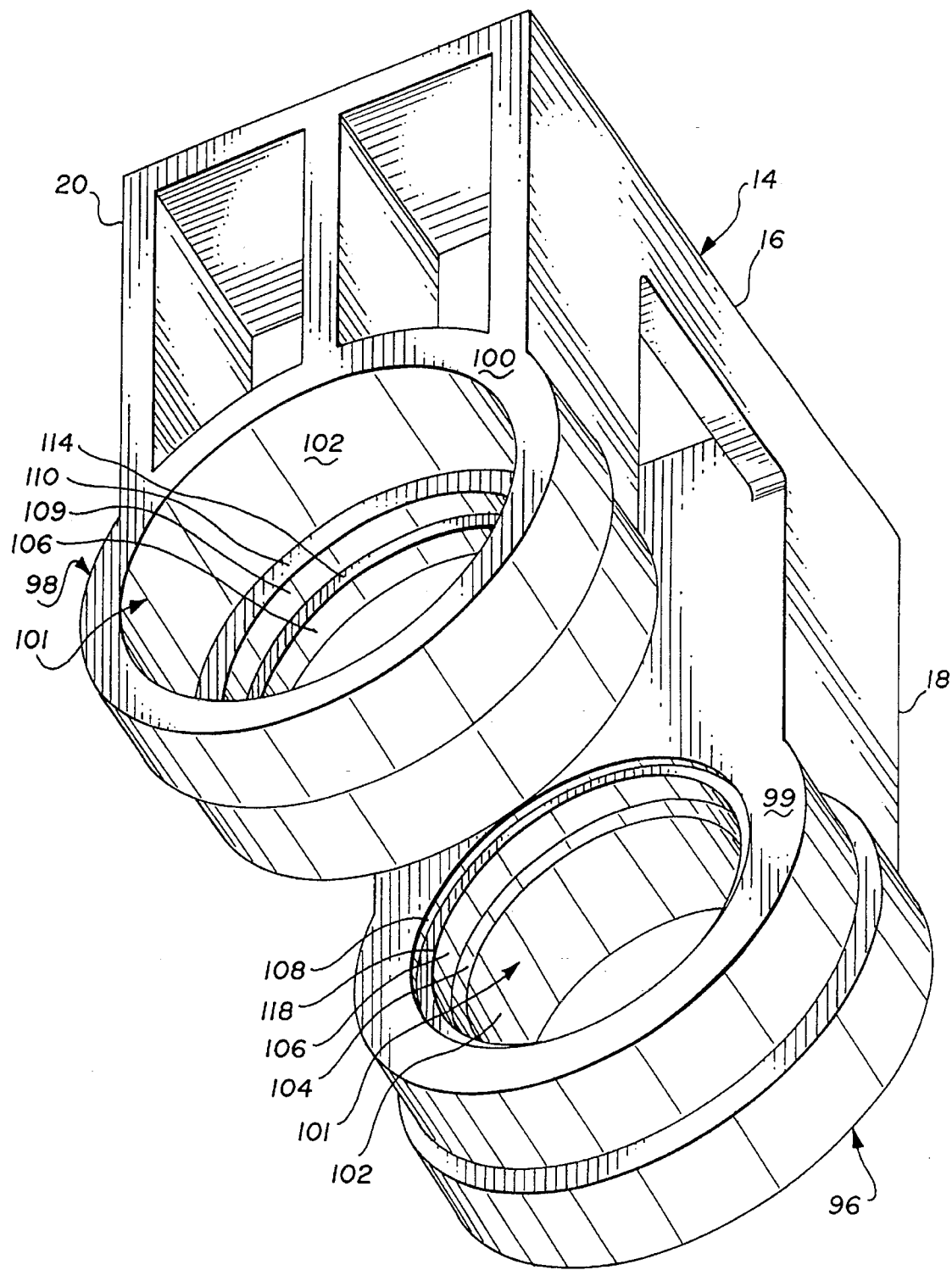
FIG. 6 is a perspective view of the fork of the spindle head of FIG. 2.

As shown in FIGS. 4 and 6, motors 92 and 94 are housed in hollow cylindrical members 96 and 98 respectively in fork arms 18 and 20 respectively. Each of the cylindrical members 96 and 98 includes inner and outer end faces 99 and 100 respectively and an inner cylindrical surface 101 therebetween which defines a housing for the motors 92 and 94 respectively.

Cylindrical inner surface 101 includes cylindrical portions 102, 104, 106 and 108. Portions 102 and 104 are separated from each other by a wall extending circumferentially radially inwardly between portions 102 and 104 which defines a shoulder 110. Portions 104 and 106 are separated from each other by a wall extending circumferentially radially inwardly between portions 104 and 106 which defines a shoulder 114. Portions 106 and 108 are separated from each other by a wall extending circumferentially inwardly between portions 106 and 108 which defines a shoulder 118.

Each of the motors 92 and 94 can also be an Inland Motor Corporation frameless, high torque servo motor including, among other known elements, a stator 120, a shaft motor 122 disposed inwardly of the stator 120, a sleeve clamp 124 disposed inwardly of and abutting the shaft motor 122, a revolving rotor 126 disposed inwardly of and abutting the sleeve clamp 124, and a stationary rotor 128 disposed inwardly of and abutting the revolving rotor 126.

According to the invention, the rotor 126 in each of the motors 92 and 94 is mounted for rotation concentric with horizontal axis A and includes a radially inwardly extending annular wall 130 having a neck 132 extending axiall outwardly and unitary therewith. The wall 130 of the rotor 126 of motor 92 extends only partially radially inwardly while the wall 130 of rotor 126 of motor 94 extends completely radially inwardly to allow the coupling of an encoder shaft 148 thereto. Motors 92 and 94 are positioned in members 96 and 98 respectively such that portions of the motors abut the inner cylindrical surface 101 and shoulders 110 and 114 thereof and, more particularly, such that the stator 120 thereof abuts portion 102 and shoulder 110 of cylindrical surface 101. Moreover, motors 92 and 94 are secured in members 96 and 98 respectively by fasteners such as screws 113 extending between motor brackets 111 on the motors 92 and 94 respectively and shoulder 114 of members 96 and 98 respectively.

The rotors 126 of the motors 92 and 94 are coupled to the opposite sides of the spindle assembly 22 and, more particularly, to the spindle housing 26 as described below for directly driving and controlling the rotation of spindle assembly 22 and spindle 24 about axis A. As shown in FIGS. 4 and 7, spindle housing 26 includes an inner cylindrical surface 133 defining a housing for spindle 24 and an outer cylindrical surface 134 having a pair of diametrically opposed rectangularly shaped rotor mounting blocks 136 and 138 formed unitary thereon. Each of the blocks 136 and 138 has an outer flat surface 140 and an cylindrical aperture 142 therein aligned concentric with axis A and extending between the outer surface 140 of blocks 136 and 138 and the inner surface 133 of spindle housing 26. The spindle assembly 22 is positioned and coupled between fork arms 18 and 20 such that the blocks 136 and 138 are aligned with the members 96 and 98 respectively and, more particularly, such that the outer surface 140 of blocks 136 and 138 abuts the inner surface 99 and shoulder 118 of the members 96 and 98 respectively.

According to the invention, the rotor 126 of each of the motors 92 and 94 is coupled directly to the blocks 136 and 138 respectively such that the annular end wall 130 of the rotor 126 abuts the outer surface 140 of blocks 136 and 138 respectively and the neck 132 on the rotor 126 is fitted into the aperture 142 in blocks 136 and 138 respectively for directly driving and controlling the rotation of spindle assembly 22 about axis A. The rotor 126 on each of the motors 92 and 94 is securely fastened to the blocks 136 and 138 respectively with fasteners such as screws 144 which extend between the annular end wall 130 of the rotor 126 and the blocks 136 and 138 respectively.

During operation, as with motor 31, numerical controls associated with the milling machine (not shown) activate motors 92 and 94 to cause the rotation of the rotor 126 in each of the motors and thus the rotation of spindle assembly 22 directly coupled thereto. Moreover, during operation, the position and velocity of rotors 126 is detected and monitored by an angle encoder 148 and encoder shaft 146 which are mounted with hollow member 98 of fork arm 20. Encoder shaft 148 extends between encoder 148 and the back of the annular end wall 130 of rotor 126 of motor 94 for providing encoder 146 with the rotary position of the rotor 126. Sleeve clamp 124 is used to lock the rotor 126 of each of the motors 92 and 94 into position after the rotor 126 has been rotated a desired amount to rotate the spindle assembly 22 a desired amount.

Figure 8:
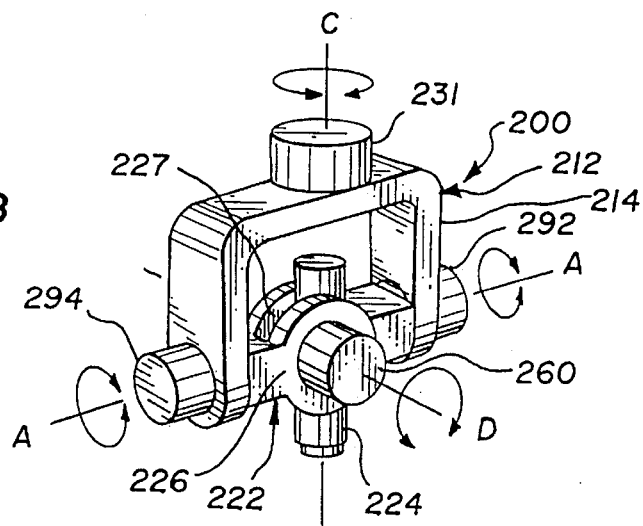
FIG. 8 is a simplified perspective view of another embodiment of a spindle head embodying the features of the present invention.

The present invention encompasses not only the use of motors to directly drive and control the rotation of a spindle and spindle head about two axis (FIGS. 1 and 2) but also the use of motors to directly drive and control the rotation of a spindle and spindle head about additional axes such as the D axis exemplified in the spindle head embodiment of FIG. 8.

FIG. 8 depicts an alternate simplified embodiment of a gearless, direct drive, multiple axes rotary head 200 embodying the features of the present invention. Head 200 differs from head 10 in that it incorporates a gimbal assembly 212 adapted to rotate spindle assembly 222 about three different orthogonal axes A, C and D, rather than just axes A and C as with gimbal assembly 12 of head 10. The rotation of spindle 224 about axis D is provided by mounting the spindle 224 in a spindle housing 226 including a cavity 227 within which spindle 224 is allowed to move side-to-side. A motor 260 is mounted to the side of spindle housing 226 and coupled to spindle 224 for directly driving and controlling the rotation of spindle 224 about axis D. Motors 231, 292 and 294 operate in the same manner as motors 31, 92 and 94 respectively to directly drive and control the rotation of the fork 214 and spindle 224 respectively about the A and C axes respectively.

According to the present invention, the use of motors coupled directly to the spindle and spindle head, instead of gears, as in present spindle heads, to rotate the spindle and spindle head advantageously allows the spindle to be rotated at high speeds in response to the abrupt and continuous changes in the contour of a surface being machined since directly mounted motors allow for the quick acceleration and deceleration of the spindle so as to maintain the required angular relationship between the spindle head and the surface being machined.

Moreover, the use of motors instead of gears is practical, reduces the complexity of the spindle head, provides a spindle head with high mechanical stiffness and eliminates the power loss which occurs when power is transferred through gear trains.

Finally, it is understood that numerous variations and modifications of the embodiments described above may be effected without departing from the spirit and scope of the novel features of the invention. It is to be understood that no limitations with respect to the specific device illustrated herein are intended or should be inferred. It is, of course, intended to cover by the appended claims all such modifications as fall within the scope of the claims.

I claim:

1. A gearless direct drive, multiple axes rotary head for a machine tool spindle comprising:

a fork mounted for rotation about a first axis and including a pair of spaced fork arms;

a spindle mounted between said fork arms for rotation about a second axis;

first motor means coupled to said fork for directly driving and controlling the rotation of said fork about said first axis; and second motor means coupled to said spindle for directly driving and controlling the rotation of said spindle about said second axis.

2. The rotary head of claim 1 further including a support arm to which said fork is mounted, said support arm including a rotatable sleeve concentric with said first axis and operably coupled to said fork for rotation therewith, said support arm further including a housing for said first motor means and said first motor means being operably coupled to said sleeve for driving and controlling the rotation of said sleeve.

3. The rotary head of claim 1 further including a support arm to which said fork is mounted, said support arm including a rotatable sleeve concentric with said first axis and operably coupled to said fork for rotation therewith, said support arm further including a housing for said first motor means, said first motor means comprising a servo motor mounted within said housing and surrounding said sleeve concentric with said first axis, said motor including a rotor rotatable and concentric about said first axis, said rotor being coupled to said sleeve for directly driving and controlling the rotation of said sleeve about said first axis.

4. The rotary head of claim 1 further including a support arm to which said fork is mounted, said support arm including a rotatable sleeve positioned concentric with said first axis and operably coupled to said fork for rotation therewith, said sleeve including opposed annular circumferential end faces, said support arm including a housing for said first motor means, said first motor means comprising a servo motor mounted within said housing and surrounding said sleeve concentric with said first axis, said motor including a rotor rotatable and concentric about said first axis and including an end with a radially outwardly extending shoulder, said rotor abutting said sleeve and said shoulder being seated on and coupled to one of said end faces of said sleeve for directly driving and controlling the rotation of said sleeve.

5. The rotary head of claim 4 further comprising a plurality of fasteners extending through and between said shoulder and said one of said end faces for coupling and securing said rotor to said sleeve.

6. The rotary head of claim 1 wherein each of said fork arms includes a hollow housing within which said second motor means is mounted.

7. The rotary head of claim 6 wherein said second motor means comprises a pair of servo motors mounted in said housing in said fork arms respectively and concentric with said second axis, each of said motors including a rotor rotatable and concentric about said second axis, each of said rotors being coupled directly to opposite sides of said spindle for driving and controlling the rotation of said spindle about said second axis.

8. The rotary head of claim 1 wherein each of said fork arms includes a hollow housing, said second motor means comprising a pair of servo motors mounted in said housing in said fork arms respectively, each of said motors including a rotor rotatable and concentric about said second axis, said spindle being mounted in a spindle housing including an outer surface with a pair of diametrically opposed blocks unitary with said outer surface and aligned with said housing in said fork arms respectively, said rotor of said motors being coupled directly to said blocks respectively for driving and controlling the rotation of said spindle about said second axis.

9. The rotary head of claim 1 wherein each said fork arms includes a hollow housing, said second motor means comprising a pair of servo motors mounted in said housing in said fork arms respectively, each of said motors including a rotor rotatable and concentric about said second axis and including a radially inwardly extending annular end wall with a neck extending axially outwardly and unitary therewith, said spindle being mounted in a spindle housing including an outer surface with a pair of diametrically opposed blocks unitary with said outer surface and aligned with said housing in said fork arms respectively, each of said blocks having an outer surface and an aperture extending centrally about said second axis into said outer surface thereof, said annular end wall on said rotor of said motors abutting said outer surface of said blocks respectively and said neck on said rotor of said motors fitting into said aperture in said blocks respectively for coupling said rotor of said motors to said spindle for directly driving and controlling the rotation of said spindle about said second axis.

10. The rotary head of claim 1 wherein said first axis is orthogonal to said second axis.

11. A gearless direct drive rotary head for a milling machine comprising a gimbal assembly mounting a spindle for rotation about a plurality of axes, and a plurality of motors coupled to said gimbal assembly and said spindle for directly driving and controlling the rotation of said gimbal assembly and said spindle about said plurality of axes respectively.

12. The rotary head of claim 11 wherein said gimbal assembly includes a fork mounted for rotation about a first axis and including a pair of spaced fork arms, a spindle mounted between said fork arms for rotation about a second axis, a first motor coupled to said fork for directly driving and controlling the rotation of said fork about said first axis, and a second motor coupled to said spindle for directly driving and controlling the rotation of said spindle about said second axis.

13. The rotary head of claim 12 further including a support arm to which said fork is mounted, said support arm including a rotatable sleeve concentric with said first axis and operably coupled to said fork for rotation therewith, said support arm further including a housing for said first motor and said first motor being operably coupled to said sleeve for driving and controlling the rotation of said sleeve.

14. The rotary head of claim 12 further including a support arm to which said fork is mounted, said support arm including a rotatable sleeve concentric with said first axis and operably coupled to said fork for rotation therewith, said support arm further including a housing for said first motor, said first motor comprising a servo motor mounted within said housing and surrounding said sleeve concentric with said first axis, said motor including a rotor rotatable and concentric about said first axis, said rotor being coupled to said sleeve for directly driving and controlling the rotation of said sleeve about said first axis.

15. The rotary head of claim 12 further including a support arm to which said fork is mounted, said support arm including a rotatable sleeve concentric with said first axis and operably coupled to said fork for rotation therewith, said sleeve including opposed annular circumferential end faces, said support arm including a housing for said first motor, said first motor comprising a servo motor mounted within said housing and surrounding said sleeve concentric with said first axis, said first motor including a rotor rotatable and concentric about said first axis and including an end with a radially outwardly extending shoulder, said rotor abutting said sleeve and said shoulder being seated on and coupled to one of said end faces of said sleeve for directly driving and controlling the rotation of said sleeve.

16. The rotary head of claim 15 further comprising a plurality of fasteners extending through and between said shoulder and one of said end faces for coupling and securing said rotor to said sleeve.

17. The rotary head of claim 12 wherein each of said fork arms includes a hollow housing and a second motor is mounted in each said housing in each of said forks.

18. The rotary head of claim 17 wherein each said second motor comprises a servo motor mounted in said housing in said fork arms respectively and concentric with said second axis, each said motor including a rotor rotatable and concentric about said second axis, each said rotor being coupled to opposite sides of said spindle for directly driving and controlling the rotation of said spindle about said second axis.

19. The rotary head of claim 12 wherein each of said fork arms includes a hollow housing and one said second motor is mounted in said housing in each of said fork arms, each said second motor comprising a servo motor including a rotor rotatable and concentric about said second axis, said spindle being mounted in a spindle housing including an outer surface with a pair of diametrically opposed blocks unitary with said outer surface and aligned with said housing in said fork arms respectively, said rotor of each said motor being coupled directly to said blocks respectively for directly driving and controlling the rotation of said spindle about said second axis.

20. The rotary head of claim 12 wherein each of said fork arms includes a hollow housing and one said second motor is mounted in said housing in each of said fork arms, each said second motor comprising a servo motor including a rotor rotatable and concentric about said second axis and including a radially inwardly extending annular end wall with a neck extending axially outwardly and unitary therewith, said spindle being mounted in a spindle housing including an outer surface with a pair of diametrically opposed blocks unitary with said outer surface and aligned with said housing in said fork arms respectively, each of said blocks having an outer surface and an aperture extending centrally about said second axis into said outer surface thereof, said annular end wall on said rotor of each said motor abutting said outer surface of each of said blocks respectively and said neck on said rotor of each said motor fitting into said aperture in each of said blocks respectively for coupling said rotor of each said motor to said spindle for directly driving and controlling the rotation of said spindle about said second axis.

21. The rotary head of claim 12 wherein said first axis is orthogonal to said second axis.

22. The rotary head of claim 12 wherein said gimbal assembly further includes a spindle housing mounting said spindle for rotation about a third axis and a third motor coupled to said spindle for directly driving and controlling the rotation of said spindle about said third axis.

\* \* \* \* \*